(12) United States Patent
Xiong et al.

(10) Patent No.: US 12,052,755 B2
(45) Date of Patent: Jul. 30, 2024

(54) METHOD AND DEVICE FOR DETERMINING SIGNAL TRANSMISSION OCCASION

(71) Applicant: Samsung Electronics Co., Ltd., Suwon-si (KR)

(72) Inventors: Qi Xiong, Beijing (CN); Bin Yu, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/310,589

(22) PCT Filed: Jan. 7, 2020

(86) PCT No.: PCT/KR2020/000256
§ 371 (c)(1),
(2) Date: Aug. 12, 2021

(87) PCT Pub. No.: WO2020/166826
PCT Pub. Date: Aug. 20, 2020

(65) Prior Publication Data
US 2022/0104253 A1 Mar. 31, 2022

(30) Foreign Application Priority Data
Feb. 14, 2019 (CN) .......................... 201910116834.1

(51) Int. Cl.
*H04W 74/0808* (2024.01)
*H04W 72/23* (2023.01)
*H04W 74/00* (2009.01)

(52) U.S. Cl.
CPC ....... *H04W 74/0808* (2013.01); *H04W 72/23* (2023.01); *H04W 74/006* (2013.01)

(58) Field of Classification Search
CPC .................... H04W 74/0808; H04W 72/23; H04W 74/006
See application file for complete search history.

(56) References Cited

U.S. PATENT DOCUMENTS

| 11,083,013 B2* | 8/2021 | Yerramalli | ............ H04W 72/53 |
| 11,737,139 B2* | 8/2023 | Shi | ...................... H04W 74/004 370/329 |
| 2023/0284271 A1* | 9/2023 | Wang | ...................... H04L 5/001 370/329 |

FOREIGN PATENT DOCUMENTS

WO 2018173005 A1 9/2018

OTHER PUBLICATIONS

International Search Report and Written Opinion of the International Searching Authority dated Apr. 13, 2020 in connection with International Application No. PCT/KR2020/000256, 8 pages.

(Continued)

*Primary Examiner* — Chandrahas B Patel

(57) ABSTRACT

The embodiments of the present application propose a method for determining a signal transmission occasion, including: acquiring configuration information of a transmission resource of an uplink signal; determining, based on the configuration information, a resource occasion where the uplink signal is transmitted; initiating a Listen Before Talk (LBT) operation before the resource occasion; determining whether the LBT operation is successful; transmitting the uplink signal at the resource occasion if the LBT operation is successful; and determining a next resource occasion where the uplink signal can be transmitted based on the configuration information if the LBT operation fails. The embodiments of the present application further propose corresponding device and computer storage medium.

19 Claims, 8 Drawing Sheets

(56) References Cited

OTHER PUBLICATIONS

Caict, "Discussions on UL signals and channels design in NR-U," R1-1901123, 3GPP TSG RAN WG1 Ad-Hoc Meeting 1901, Taipei, Jan. 21-25, 2019, 4 pages.
Nokia, et al., "On uplink signal and channel structures for NR-U," R1-1900260, 3GPP TSG RAN WG1 Ad-Hoc Meeting 1901, Taipei, Taiwan, Jan. 21-25, 2019, 12 pages.
Oppo, " UL signals and channels for NR-U," R1-1900271, 3GPP TSG RAN WG1 Ad-Hoc Meeting 1901, Taipei, Jan. 21-25, 2019, 5 pages.
Qualcomm Incorporated, "UL signals and channels for NR-U," R1-1900872, 3GPP TSG RAN WG1 Meeting AH-1901, Taipei, Taiwan, Jan. 21-25, 2019, 20 pages.

* cited by examiner

METHOD AND DEVICE FOR DETERMINING SIGNAL TRANSMISSION OCCASION

CROSS-REFERENCE TO RELATED APPLICATIONS

This application is a National Phase Entry of PCT International Application No. PCT/KR2020/000256, which was filed on Jan. 7, 2020, and claims priority to Chinese Patent Application No. 201910116834.1, filed in the Chinese Intellectual Property Office on Feb. 14, 2019, the content of each of which are incorporated herein by reference.

BACKGROUND

1. Field

The present application relates to the field of wireless communication technologies, and more particularly, to a method and device for determining a signal transmission occasion and a storage medium.

2. Description of the Related Art

In order to meet the huge traffic demand, a 5G communication system is expected to operate on high-band resources from a low band up to about 100G, comprising licensed bands and unlicensed bands. Here, the unlicensed bands mainly comprise a 5 GHz band and a 60 GHz band. In the 5 GHz band, a 802.11 series of Wireless Fidelity (WiFi) systems, radars, and LTE's Licensed Assisted Access (LAA) systems have been deployed, all of which follow a Listen before Talk (LBT) mechanism, that is, a wireless channel must be detected before a signal is transmitted, and the wireless channel may be occupied to transmit the signal only when the wireless channel is detected to be idle. In the 60 GHz band, 802.11ay systems already exist, and therefore the LBT mechanism is also required to be followed. In other unlicensed bands, an effective coexistence mode shall be established according to corresponding specifications.

When random access is performed in an unlicensed spectrum, the UE further needs to perform the LBT operation when the UE is ready to transmit a message 3. However, once the LBT fails, it may result in failure in transmission of the message 3, which reduces the access probability of the UE, and deteriorates the access delay of the UE.

Therefore, there is a need for a method and device for mitigating the impact due to the failure in the transmission of the message 3 caused by the failure of the LBT.

SUMMARY

To this end, the embodiments of the present application propose a method and device for determining a signal transmission occasion and a storage medium.

According to a first aspect of the present application, there is proposed a method for determining a signal transmission occasion, comprising: acquiring configuration information of a transmission resource of an uplink signal; determining, based on the configuration information, a resource occasion where the uplink signal is transmitted; initiating a Listen Before Talk (LBT) operation before the resource occasion; determining whether the LBT operation is successful; transmitting the uplink signal at the resource occasion if the LBT operation is successful; and determining a next resource occasion where the uplink signal can be transmitted based on the configuration information if the LBT operation fails.

In some embodiments, acquiring configuration information of a transmission resource of an uplink signal comprises acquiring the configuration information of the transmission resource of the uplink signal through at least one of: uplink grant information; separate dedicated channel indicator configuration; upper layer control signaling; and pre-configured parameter information.

In some embodiments, the configuration information comprises a starting offset of a first time unit and a starting value of a second time unit, and determining, based on the configuration information, a resource occasion where the uplink signal is transmitted comprises: determining, using the time at which the latest configuration information of the transmission resource of the uplink signal is acquired as a starting point, the resource occasion where the uplink signal is transmitted based on the starting offset of the first time unit and the starting value of the second time unit.

In some embodiments, determining a next resource occasion where the uplink signal is transmitted based on the configuration information comprises: determining, based on the configuration information, the next resource occasion where the uplink signal is transmitted, until the LBT operation is successful or a predetermined condition for abandoning transmission of the uplink signal is satisfied.

In some embodiments, the configuration information further comprises a starting value adjustment step size of the second time unit, and determining, based on the configuration information, the next resource occasion where the uplink signal is transmitted, until the LBT operation is successful or a predetermined condition for abandoning transmission of the uplink signal is satisfied comprises: a) shifting the newly determined resource occasion by the starting value adjustment step size of the second time unit, and determining the shifted resource occasion as the next resource occasion where the uplink signal is transmitted, or shifting the resource occasion which is determined based on the starting offset of the first time unit and the starting value of the second time unit by $N\_Sstep$ times of the starting value adjustment step size of the second time unit, and determining the shifted resource occasion as the next resource occasion where the uplink signal is transmitted, where $N\_Sstep$ is an integer, and increases with a number of failures of the LBT operation; b) initiating the LBT operation before the next resource occasion where the uplink signal is transmitted; and c) repeating steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit, and determining, based on the configuration information, the next resource occasion where the uplink signal is transmitted, until the LBT operation is successful or a predetermined condition for abandoning transmission of the uplink signal is satisfied comprises: a) shifting the newly determined resource occasion by the starting offset adjustment step size of the first time unit, and determining the shifted resource occasion as the next resource occasion where the uplink signal is transmitted, or shifting the resource occasion which is determined based on the starting offset of the first time unit and the starting value of the second time unit by $N\_k2step$ times of the starting offset adjustment step size of the first time unit, and determining the shifted resource occasion as the next resource occasion where the uplink signal is transmitted, where $N\_k2step$ is an integer, and increases with a number of failures of the LBT operation; b) initiating the LBT operation before the next resource occasion where the uplink signal is transmitted; and c) repeating steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit and a starting value adjustment step size of the second time unit, and determining, based on the configuration information, the next resource occasion where the uplink signal is transmitted, until the LBT operation is successful or a predetermined condition for abandoning transmission of the uplink signal is satisfied comprises: a) shifting the newly determined resource occasion by the starting value adjustment step size of the second time unit, and determining the shifted resource occasion as the next resource occasion where the uplink signal is transmitted, or shifting the resource occasion, which is determined based on the starting offset of the first time unit and the starting value of the second time unit, by N_Sstep times of the starting value adjustment step size of the second time unit, and determining the shifted resource occasion as the next resource occasion where the uplink signal is transmitted, where N_Sstep is an integer, and increases with a number of failures of the LBT operation; b) initiating the LBT operation before the next resource occasion where the uplink signal is transmitted; c) repeating steps a) and b) if the LBT operation fails, until the LBT operation is successful or the predetermined condition for abandoning the transmission of the uplink signal is satisfied; d) if the predetermined condition for abandoning the transmission of the uplink signal is satisfied but the LBT operation is still not successful, shifting the resource occasion, which is determined based on the starting offset of the first time unit and the starting value of the second time unit, by N_k2step times of the starting offset adjustment step size of the first time unit, and determining the shifted resource occasion as the next resource occasion where the uplink signal is transmitted, where N_k2step is an integer, and increases with an execution number of step d); and e) repeating steps a) to d), until the LBT operation is successful or another predetermined condition for abandoning the transmission of the uplink signal is satisfied.

According to a second aspect of the present application, there is provided a User Equipment (UE), comprising: a configuration information acquisition module configured to acquire configuration information of a transmission resource of an uplink signal; a resource occasion determination module configured to determine, based on the configuration information, a resource occasion where the uplink signal is transmitted; a Listen Before Talk (LBT) module configured to initiate a Listen Before Talk (LBT) operation before the resource occasion and determine whether the LBT operation is successful; and a signal transmission module configured to transmit the uplink signal at the resource occasion if the LBT operation is successful, wherein if the LBT operation fails, the resource occasion determination module is further configured to determine a next resource occasion where the uplink signal is transmitted based on the configuration information.

According to a third aspect of the present application, there is provided a User Equipment (UE), comprising: a processing unit; and a storage unit configured to store machine readable instructions which, when executed by the processing unit, configure the processing unit to perform the method according to the second aspect.

According to a fourth aspect of the present application, there is provided a computer readable storage medium having stored thereon executable instructions which, when executed by a processor, cause the processor to perform the method according to the first aspect.

With the above method, the UE may perform LBT attempt at multiple possible positions, which improves the possibility that the UE transmits the uplink data, and ensures the timeliness of the data communication, for example, ensures the success rate of the uplink transmission of the random access message 3, thereby facilitating avoiding a very high access delay, and alleviating the impact due to the failure in the transmission of the message 3 caused by the failure of the LBT.

BRIEF DESCRIPTION OF THE DRAWINGS

The above and additional aspects and advantages of the present application will become more apparent and readily understood from the following description in conjunction with the accompanying drawings, in which.

Figure 1:
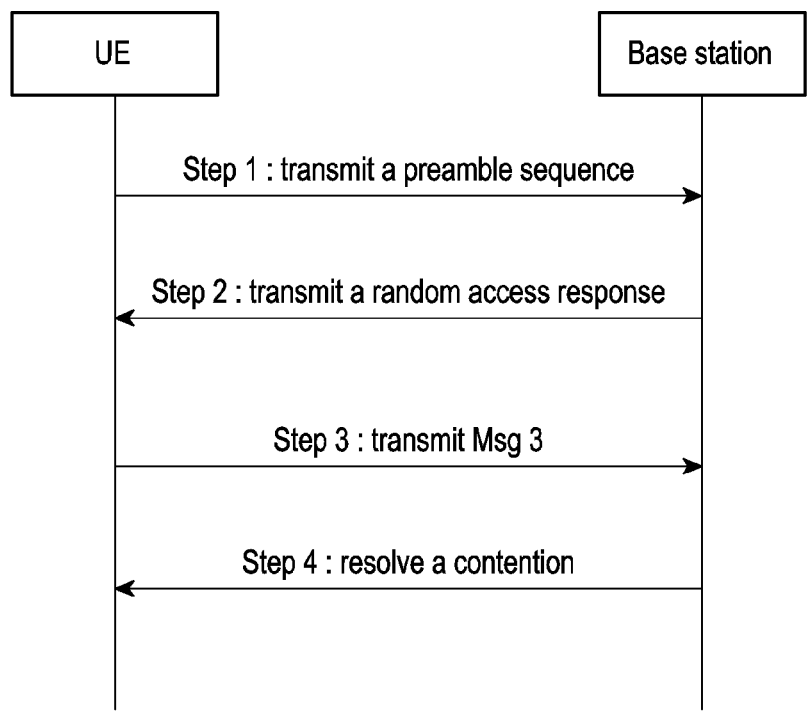
FIG. 1 illustrates a schematic flowchart of a contention based random access process in LTE-A.

In the accompanying drawings, the same or similar structures are identified by the same or similar reference signs.

DETAILED DESCRIPTION

The embodiments of the present application will be described in detail below, and examples of the embodiments are illustrated in the accompanying drawings, throughout which the same or similar reference signs are used to refer to the same or similar elements or elements having the same or similar functions. The embodiments described below with reference to the accompanying drawings are intended to be illustrative only, and are merely used to explain the present application, but should not be construed as limiting the present application.

It can be understood by those skilled in the art that singular forms "a", "an", "the" used here may also comprise plural forms, unless otherwise stated. It should also be understood that phrase "comprise" used in the specification of the present application refers to presence of the features, integers, steps, operations, elements and/or components, but should not preclude the presence or addition of one or more other features, integers, steps, operations, elements, components, and/or groups thereof. It should be understood that when an element is referred to as being "connected" or "coupled" to another element, it may be directly connected or coupled to the other element, or there may be an intermediate element therebetween. Further, "connected" or "coupled" as used here may comprise either a wireless connection or a wireless coupling. The phrase "and/or" used here comprises all or any of one or more of associated listed items, or all combinations thereof.

It can be understood by those skilled in the art that all terms (comprising technical and scientific terms) used here have the same meaning as commonly understood by those of ordinary skill in the art to which the present application belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

It can be understood by those skilled in the art that the "terminal" and "terminal device" used here comprise not only a wireless signal receiver device, which has only a wireless signal receiver without a transmitting capability, but also comprise a receiving and transmitting hardware device which is capable of two-way communication over a two-way communication link. Such a device may comprise: a cellular or other communication device which may comprise a single line display or a multi-line display or may not comprise a multi-line display; a Personal Communication Service (PCS), which may comprise voice, data processing, fax, and/or data communication capabilities; a Personal Digital Assistant (PDA), which may comprise a radio frequency receiver, a pager, Internet/Intranet access, a web browser, a notepad, a calendar, and/or a Global Positioning System (GPS) receiver; and a conventional laptop and/or palmtop computer or other device having and/or comprising a radio frequency receiver. The "terminal" and "terminal device" used here may be portable, transportable, installed in transportations (aviation transportations, sea transportations and/or land transportations), or adapted and/or configured to operate locally, and/or operate in any other location on the earth and/or space in a distributed form. The "terminal" and "terminal device" used here may also be communication terminals, internet terminals, or music/video playing terminals, for example, PDAs, Mobile Internet Devices (MIDs), and/or mobile phones having music/video playback functions, or may also be devices such as smart TVs, set-top boxes etc.

Transmission in a wireless communication system comprises: transmission from a base station (gNB) to a User Equipment (UE) (referred to as downlink transmission), wherein a corresponding slot is called a downlink slot; and transmission from the UE to the base station (referred to as uplink transmission), wherein a corresponding slot is called an uplink slot.

In downlink communication of the wireless communication system, the system periodically transmits a synchronization signal and a broadcast channel to a user through a Synchronization Signal Block (SSB)/Physical Broadcast Channel (PBCH) block, and a corresponding period is an SSB period, or is called an SSB burst period. At the same time, the base station may configure a Physical Random Access Channel (PRACH) configuration period, and configure a certain number of PRACH transmission Occasions (ROs) in this period, and it is satisfied that all SSBs in a mapping period (with a certain length of time) may be mapped to the respective ROs.

In a New Radio (NR) communication system, performance of random access directly affects the user's experience before the establishment of radio resource control, for example, during random access. In a conventional wireless communication system, such as LTE and LTE-Advanced, a random access process is applied to multiple scenarios such as establishment of an initial link, cell handover, re-establishment of an uplink, and re-establishment of a RRC connection etc., and is divided into contention-based random access and contention-free random access according to whether a user monopolizes preamble sequence resources. In the contention-based random access, in a process of each user attempting to establish an uplink, the user selects a preamble sequence from the same preamble sequence resources, and there may be a possibility that multiple users may select the same preamble sequence and transmit it to a base station. Therefore, a conflict resolution mechanism is an important research direction in random access. How to reduce the probability of contention and how to quickly resolve conflicts which have already occurred is a key indicator that affects the performance of random access.

In the LTE-A, the contention-based random access process is divided into four steps, as shown in FIG. 1. In a first step, a user randomly selects a preamble sequence from a preamble sequence resource pool and transmits the preamble sequence (message 1: Msg1) to a base station; and the base station performs correlation detection on the received signal to identify the preamble sequence transmitted by the user. In a second step, the base station transmits a Random Access Response (RAR) (message 2: Msg2) to the user, including a random access preamble sequence identity, a timing advance instruction determined according to an estimated delay between the user and the base station, a temporary Cell-Radio Network Temporary Identity (C-RNTI), and a time frequency resource allocated for a next uplink transmission of the user. In a third step, the user transmits a third message (message 3: Msg3) to the base station according to information in the RAR, wherein the Msg3 comprises information such as a user terminal identity and an RRC link request etc., wherein the user terminal identity is unique to the user and is used to resolve the conflict. In a fourth step, the base station transmits a conflict resolution identity to the user, including a user terminal identity which wins the conflict resolution. After the user detects his/her own identity, the user upgrades the temporary C-RNTI to a C-RNTI, and transmits an Acknowledgement (ACK) signal to the base station to complete the random access process and wait for being scheduled by the base station. Otherwise, the user may start a new random access process after a delay.

For the contention-free random access process, a preamble sequence may be allocated to the user since the base station knows the user identity. Therefore, when the user transmits the preamble sequence, the user does not need to randomly select a sequence, but uses the allocated preamble sequence. After the base station detects the allocated preamble sequence, the base station may transmit a corresponding random access response, including information such as a timing advance and uplink resource allocation etc. After the user receives the random access response, the user considers that uplink synchronization has been completed and waits for being further scheduled by the base station. Therefore, the contention-free random access process only comprises two steps, which are a first step of transmitting a preamble sequence; and a second step of transmitting a random access response.

The random access process in the LTE is applicable to the following scenarios:
1. Initial access under RRC_IDLE;
2. Re-establishment of a RRC connection;
3. Cell handover;
4. In a RRC connected state, downlink data arrives and there is a request for a random access process (when the uplink is in a non-synchronous mode);
5. In the RRC connected state, the uplink data arrives and there is a request for a random access process (when the uplink is in a non-synchronization mode or there are no resources allocated for a scheduling request in Physical Uplink Control Channel (PUCCH) resources); and
6. Positioning.

In order to meet the huge traffic demand, a 5G communication system is expected to operate on high-band resources from a low band up to about 100G, comprising licensed bands and unlicensed bands. Here, the unlicensed bands mainly comprise a 5 GHz band and a 60 GHz band. A 5G system operating in an unlicensed band is referred to as an NR-U system, which may comprise a scenario of operating independently on an unlicensed band, and a scenario of operating on a licensed band in a Dual connectivity (DC) mode, or may further comprise a scenario of operating on a licensed band in a Carrier Aggregation (CA) mode. In the 5 GHz band, a 802.11 series of Wireless Fidelity (WiFi) systems, radars, and LTE's Licensed Assisted Access (LAA) systems have been deployed, all of which follow a Listen before Talk (LBT) mechanism, that is, a wireless channel must be detected before a signal is transmitted, and the wireless channel may be occupied to transmit the signal only when the wireless channel is detected to be idle. In the 60 GHz band, 802.11ay systems already exist, and therefore the LBT mechanism is also required to be followed. In other unlicensed bands, an effective coexistence mode shall be established according to corresponding specifications.

The LBT mechanism may be divided into two types. One type of LBT mechanism is called a first type of LBT, commonly known as Category 4 LBT (TS 36.213 15.2.1.1), which determines a contention Window Size (CWS) and randomly generates a back-off factor X. If X Clear Channel Assessment (CCA) slots are idle, a signal may be transmitted. The first type of LBT is divided into four LBT priority classes, which correspond to different Quality Criterion Indicators (QCIs). Different LBT priority classes may correspond to different CWS sizes (that is, different sets of CW values), different back-off defer periods (which are equal to 16+9*n microseconds, where n is an integer greater than or equal to 1), and different Maximum Channel Occupancy Time (MCOT). The other type of LBT mechanism is called a second type of LBT (TS 36.213 15.2.1.2), in which a transmitting terminal only needs to perform one CCA detection process for 25 us before the start of signal transmission which is defined in a standard, and if the channel is idle, a signal may be transmitted.

Therefore, when random access is performed in an unlicensed spectrum, the UE further needs to perform the LBT operation when the UE completely transmits a message 1, receives a message 2, and is ready to transmit a message 3. However, once the LBT fails, it may result in failure in transmission of the message 3, which reduces the access probability of the UE, and deteriorates the access delay of the UE. Therefore, how to mitigate the impact due to the failure in the transmission of the message 3 caused by the failure of the LBT is a problem to be solved.

Figure 2:
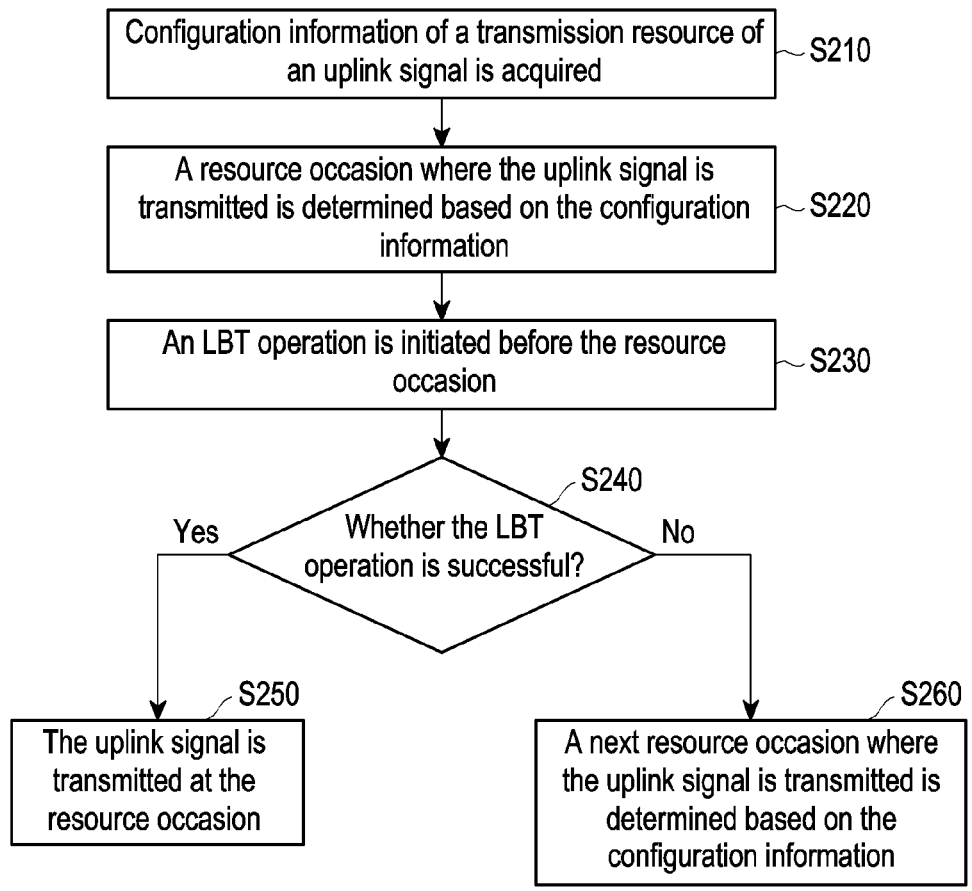
FIG. 2 illustrates a schematic flowchart of a method for determining a signal transmission occasion according to an embodiment of the present application.

In order to at least partially solve the above problems, the embodiments of the present application provide a method and device for determining a signal transmission occasion. FIG. 2 illustrates a method for determining a signal transmission occasion according to an embodiment of the present application. As shown in FIG. 2, the method comprises the following steps.

In step S210, configuration information of a transmission resource of an uplink signal is acquired.

In step S220, a resource occasion where the uplink signal is transmitted is determined based on the configuration information.

In step S230, a Listen Before Talk (LBT) operation is initiated before the resource occasion.

In step S240, it is determined whether the LBT operation is successful.

If the LBT operation is successful, in step S250, the uplink signal is transmitted at the resource occasion.

If the LBT operation fails, in step S260, a next resource occasion where the uplink signal is transmitted is determined based on the configuration information.

In some embodiments, acquiring configuration information of a transmission resource of an uplink signal comprises acquiring the configuration information of the transmission resource of the uplink signal through at least one of:
uplink grant information;
separate dedicated channel indicator configuration;
upper layer control signaling; and
pre-configured parameter information.

In some embodiments, the configuration information comprises a starting offset of a first time unit and a starting value of a second time unit, and
determining, based on the configuration information, a resource occasion where the uplink signal is transmitted comprises:
determining, using the time at which the latest configuration information of the transmission resource of the uplink signal is acquired as a starting point, the resource occasion where the uplink signal is transmitted based on the starting offset of the first time unit and the starting value of the second time unit.

In some embodiments, determining a next resource occasion where the uplink signal is transmitted based on the configuration information comprises:
determining, based on the configuration information, the next resource occasion where the uplink signal is transmitted, until the LBT operation is successful or a predetermined condition for abandoning transmission of the uplink signal is satisfied.

In some embodiments, the configuration information further comprises a starting value adjustment step size of the second time unit, and
determining, based on the configuration information, the next resource occasion where the uplink signal is transmitted, until the LBT operation is successful or a predetermined condition for abandoning transmission of the uplink signal is satisfied comprises:
a) shifting the newly determined resource occasion by the starting value adjustment step size of the second time unit, and determining the shifted resource occasion as the next resource occasion where the uplink signal is transmitted, or shifting the resource occasion, which is determined based on the starting offset of the first time unit and the starting value of the second time unit, by N_Sstep times of the starting value adjustment step size of the second time unit, and determining the shifted resource occasion as the next resource occasion where the uplink signal is transmitted, where N_Sstep is an integer, and increases with a number of failures of the LBT operation;

b) initiating the LBT operation before the next resource occasion where the uplink signal is transmitted; and c) repeating steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit, and determining, based on the configuration information, the next resource occasion where the uplink signal is transmitted, until the LBT operation is successful or a predetermined condition for abandoning transmission of the uplink signal is satisfied comprises:

a) shifting the newly determined resource occasion by the starting offset adjustment step size of the first time unit, and determining the shifted resource occasion as the next resource occasion where the uplink signal is transmitted, or shifting the resource occasion, which is determined based on the starting offset of the first time unit and the starting value of the second time unit, by N_k2step times of the starting offset adjustment step size of the first time unit, and determining the shifted resource occasion as the next resource occasion where the uplink signal is transmitted, where N_k2step is an integer, and increases with a number of failures of the LBT operation;

b) initiating the LBT operation before the next resource occasion where the uplink signal is transmitted; and c) repeating steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit and a starting value adjustment step size of the second time unit, and determining, based on the configuration information, the next resource occasion where the uplink signal is transmitted, until the LBT operation is successful or a predetermined condition for abandoning transmission of the uplink signal is satisfied comprises:

a) shifting the newly determined resource occasion by the starting value adjustment step size of the second time unit, and determining the shifted resource occasion as the next resource occasion where the uplink signal is transmitted, or shifting the resource occasion, which is determined based on the starting offset of the first time unit and the starting value of the second time unit, by N_Sstep times of the starting value adjustment step size of the second time unit, and determining the shifted resource occasion as the next resource occasion where the uplink signal is transmitted, where N_Sstep is an integer, and increases with a number of failures of the LBT operation;

b) initiating the LBT operation before the next resource occasion where the uplink signal is transmitted;

c) repeating steps a) and b) if the LBT operation fails, until the LBT operation is successful or the predetermined condition for abandoning the transmission of the uplink signal is satisfied;

d) if the predetermined condition for abandoning the transmission of the uplink signal is satisfied but the LBT operation is still not successful, shifting the resource occasion, which is determined based on the starting offset of the first time unit and the starting value of the second time unit, by N_k2step times of the starting offset adjustment step size of the first time unit, and determining the shifted resource occasion as the next resource occasion where the uplink signal is transmitted, where N_k2step is an integer, and increases with an execution number of step d); and e) repeating steps a) to d), until the LBT operation is successful or another predetermined condition for abandoning the transmission of the uplink signal is satisfied.

Figure 3:
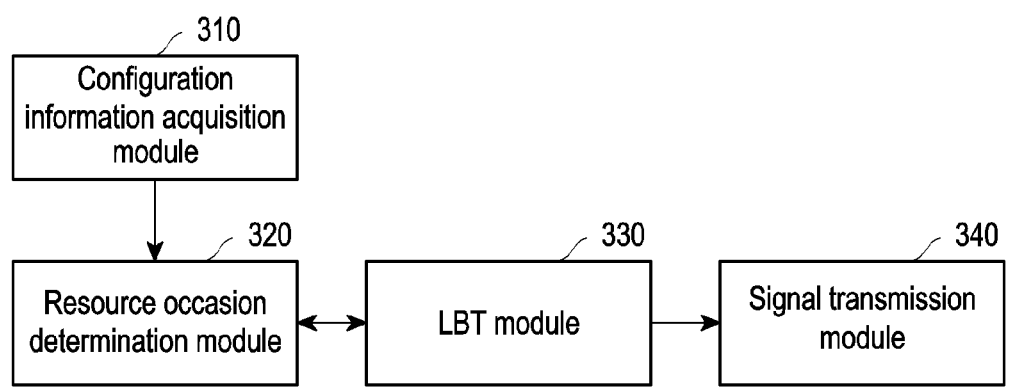
FIG. 3 illustrates a schematic block diagram of a User Equipment (UE) according to an embodiment of the present application.
Figure 4:
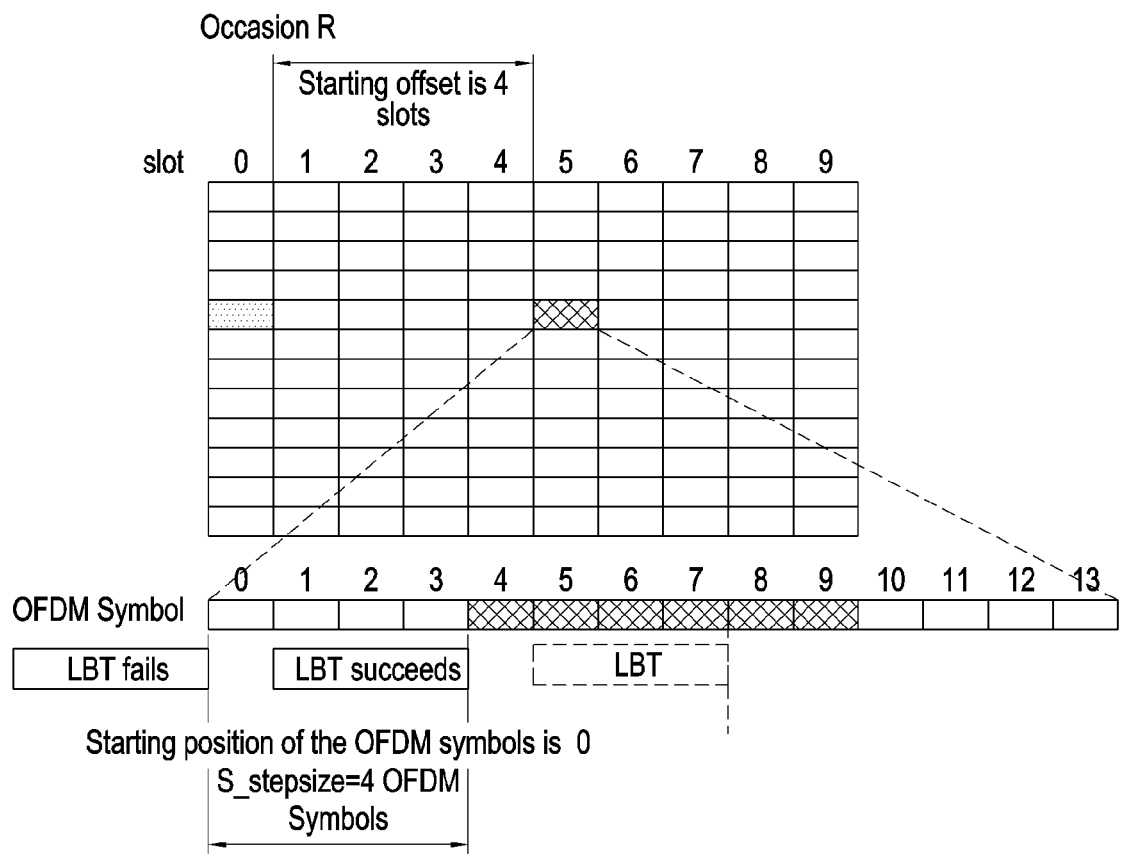
FIG. 4 illustrates a schematic diagram of a method for determining a signal transmission occasion according to an embodiment of the present application.

FIG. 3 illustrates a schematic block diagram of a user equipment according to an embodiment of the present application. As shown in FIG. 3, the user equipment comprises a configuration information acquisition module 310, a resource occasion determination module 320, an LBT module 330 and a signal transmission module 340. The configuration information acquisition module 310 is configured to acquire configuration information of a transmission resource of an uplink signal. The resource occasion determination module 320 is configured to determine a resource occasion where the uplink signal is transmitted based on the configuration information. The LBT module 330 is configured to initiate a Listen Before Talk (LBT) operation before the resource occasion, and determine whether the LBT operation is successful. The signal transmission module 340 is configured to transmit the uplink signal at the resource occasion if the LBT operation is successful. The resource occasion determination module 320 is further configured to determine a next resource occasion where the uplink signal can be transmitted based on the configuration information if the LBT operation fails.

In some embodiments, the configuration information acquisition module 310 is configured to acquire the configuration information of the transmission resource of the uplink signal through at least one of:

uplink grant information;
separate dedicated channel indicator configuration;
upper layer control signaling; and
pre-configured parameter information.

In some embodiments, the configuration information comprises a starting offset of a first time unit and a starting value of a second time unit, and the resource occasion determination module 320 may be configured to:

determine, using the time at which the latest configuration information of the transmission resource of the uplink signal is acquired as a starting point, the resource occasion where the uplink signal is transmitted based on the starting offset of the first time unit and the starting value of the second time unit.

In some embodiments, the resource occasion determination module 320 may be configured to determine, based on the configuration information, the next resource occasion where the uplink signal is transmitted, until the LBT operation is successful or a predetermined condition for abandoning transmission of the uplink signal is satisfied.

In some embodiments, the configuration information further comprises a starting value adjustment step size of the second time unit, and the resource occasion determination module 320 may be configured to:

a) shift the newly determined resource occasion by the starting value adjustment step size of the second time unit, and determine the shifted resource occasion as the next resource occasion where the uplink signal is transmitted, or shift the resource occasion, which is determined based on the starting offset of the first time unit and the starting value of the second time unit, by N_Sstep times of the starting value adjustment step size of the second time unit, and determine the shifted resource occasion as the next resource occasion where the uplink signal is transmitted, where N_Sstep is an integer, and increases with a number of failures of the LBT operation;

b) initiate the LBT operation before the next resource occasion where the uplink signal is transmitted; and c) repeat steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit, and the resource occasion determination module 320 may be configured to:

a) shift the newly determined resource occasion by the starting offset adjustment step size of the first time unit, and determine the shifted resource occasion as the next resource occasion where the uplink signal is transmitted, or shift the resource occasion, which is determined based on the starting offset of the first time unit and the starting value of the second time unit, by N_k2step times of the starting offset adjustment step size of the first time unit, and determine the shifted resource occasion as the next resource occasion where the uplink signal is transmitted, where N_k2step is an integer, and increases with a number of failures of the LBT operation;

b) initiate the LBT operation before the next resource occasion where the uplink signal is transmitted; and c) repeat steps a) and b) if the LBT operation fails, until the LBT operation is successful or the predetermined condition for abandoning the transmission of the uplink signal is satisfied.

In some embodiments, the configuration information further comprises a starting offset adjustment step size of the first time unit and a starting value adjustment step size of the second time unit, and the resource occasion determination module 320 may be configured to:

a) shift the newly determined resource occasion by the starting value adjustment step size of the second time unit, and determine the shifted resource occasion as the next resource occasion where the uplink signal is transmitted, or shift the resource occasion, which is determined based on the starting offset of the first time unit and the starting value of the second time unit, by N_Sstep times of the starting value adjustment step size of the second time unit, and determine the shifted resource occasion as the next resource occasion where the uplink signal is transmitted, where N_Sstep is an integer, and increases with a number of failures of the LBT operation;

b) initiate the LBT operation before the next resource occasion where the uplink signal is transmitted;

c) repeat steps a) and b) if the LBT operation fails, until the LBT operation is successful or the predetermined condition for abandoning the transmission of the uplink signal is satisfied;

d) if the predetermined condition for abandoning the transmission of the uplink signal is satisfied but the LBT operation is still not successful, shift the resource occasion, which is determined based on the starting offset of the first time unit and the starting value of the second time unit, by N_k2step times of the starting offset adjustment step size of the first time unit, and determine the shifted resource occasion as the next resource occasion where the uplink signal is transmitted, where N_k2step is an integer, and increases with an execution number of step d); and e) repeat steps a) to d), until the LBT operation is successful or another predetermined condition for abandoning the transmission of the uplink signal is satisfied.

The technical solutions according to the present application will be described in detail below according to specific examples. It is to be understood that the following specific implementations are merely examples for implementing the technical solutions according to the present application, and should not be construed as limiting the technical solutions according to the present application. Further, although the technical solutions described below are mainly described for an LTE system, the application scenario thereof is not limited to the LTE communication system, but may be applied to any other system involving failure of the LBT operation.

It should be illustrated that the accompanying drawings are only schematic diagrams provided for the purpose of facilitating understanding of the technical solutions according to the present application. The technical solutions according to the present application are not limited by steps and/or structures shown in the accompanying drawings.

A time domain unit (also referred to as a time unit) in the present disclosure may be: one OFDM symbol, one OFDM symbol group (consisting of multiple OFDM symbols), one slot, one slot group (consisting of multiple slots), one subframe, one subframe group (consisting of multiple subframes), one system frame, one system frame group (consisting of multiple system frames), or an absolute time unit, such as 1 millisecond, 1 second, etc. The time unit may also be a combination of multiple granularities, such as N1 slots plus N2 OFDM symbols.

A frequency domain unit in the present disclosure may be: one subcarrier, one subcarrier group (consisting of multiple subcarriers), one Resource Block (RB), which may also be called a Physical Resource Block (PRB), one resource block group (consisting of multiple RBs), one Bandwidth Part (BWP), one bandwidth part group (consisting of multiple BWPs), one band/carrier, one band group/carrier group, or an absolute frequency domain unit, such as 1 Hz, 1 kHz, etc. The frequency domain unit may also be a combination of multiple granularities, such as M1 PRBs plus M2 subcarriers.

In order to make the purposes, technical solutions and advantages of the present application more clear and obvious, the present application will be further described in detail below with reference to the accompanying drawings and specific embodiments.

Embodiment

Specifically, in the present embodiment, the UE obtains time-frequency resource configuration information for transmission of an uplink signal from a network side and/or pre-configured information, wherein the UE may obtain the time-frequency resource configuration information from at least one of:

1. Random Access Response (RAR) of a random access process, for example, Uplink (UL) grant information;

2. Downlink control information for scheduling uplink transmission, for example, uplink grant information therein or separate dedicated channel indicator configuration, wherein the scheduled uplink transmission may be new data transmission or data retransmission;

3. System message transmitted by the network side or upper layer control signaling, such as a RRC configuration message etc. obtained by the UE; and 4. Pre-configured parameter information;

wherein the time-frequency resource configuration information comprises at least one of:

1. Starting offset of a first time unit position (i.e., initial slot level offset), which is k2_initial first time units (TU1s);

2. Starting value of a second time unit position (i.e., initial starting symbol position), which is S_initial second time units (TU2s);

3. Starting offset adjustment step size (i.e., slot level offset step size, which is used to determine the additional slot level offset) of the first time unit position, which is k2_stepsize first time units;

4. Starting value adjustment step size (i.e., symbol level offset step size, which is used to determine the additional starting symbol position) of the second time unit position, which is S_stepsize second time units;

5. A time length of the time-frequency resource, which is a length of L third time units (TU3s);

6. Maximum adjustment step size of the starting offset of the first time unit position, which is N_k2stepmax steps; or maximum adjustment amount of the starting offset of the first time unit position, which is N_k2 first time units; and 7. Maximum adjustment step size of the starting value of the second time unit position, which is N_Sstepmax steps; or maximum adjustment amount of the starting value of the second time unit position, which is N_S second time units;

wherein the first time unit, the second time unit, and the third time unit may be the same and may be different from each other. In the present embodiment, the method according to the present disclosure is described by taking the first time unit TU1 being a slot, and the second time unit TU2 and the third time unit TU3 being OFDM symbols as an example. Other time unit granularity methods are similar and will not be repeated.

When the UE determines the time-frequency resource configuration information for the transmission of the uplink signal by using multiple piece of information, the UE may use the time at which when the latest information for determining the time-frequency resource configuration information for transmission of the uplink signal is received as the latest time at which the time-frequency resource configuration information for the transmission of the uplink signal is received. In the present embodiment, for example, the time at which uplink grant information is received represents the latest time at which the time-frequency resource configuration information for the transmission of the uplink signal is received.

Figure 5:
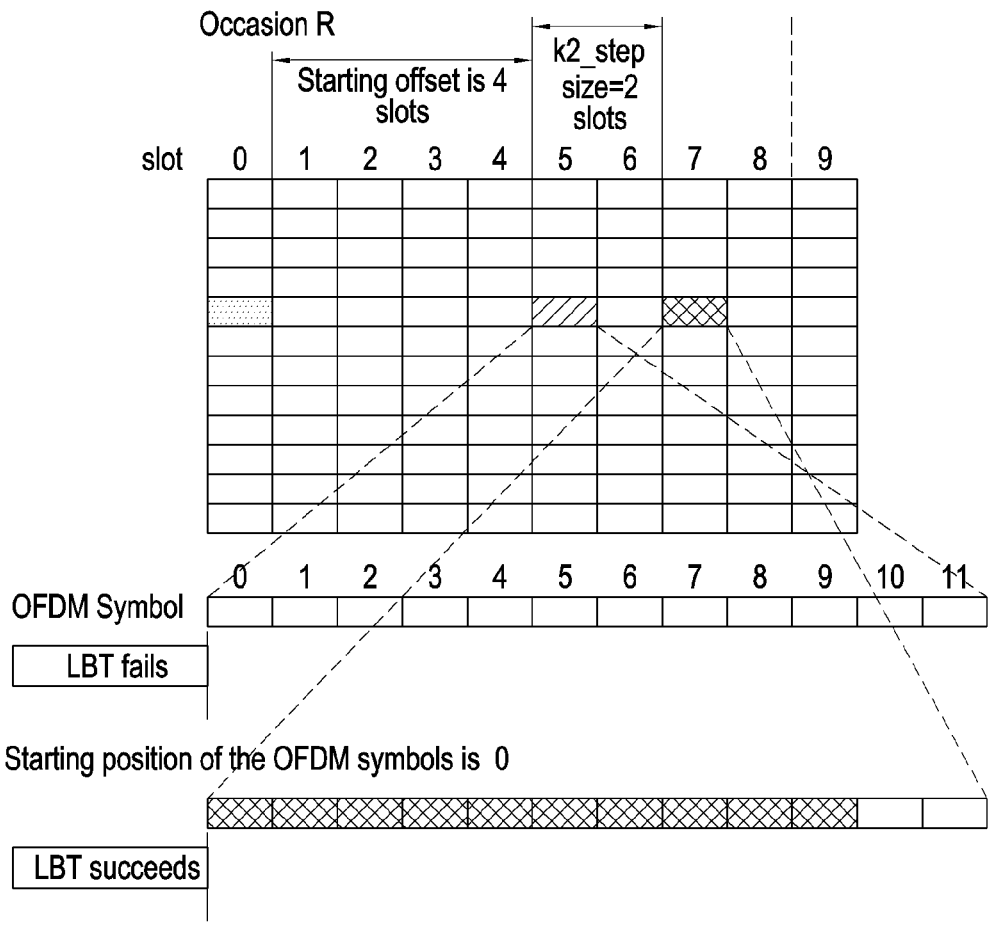
FIG. 5 illustrates a schematic diagram of a method for determining a signal transmission occasion according to an embodiment of the present application.
Figure 6:
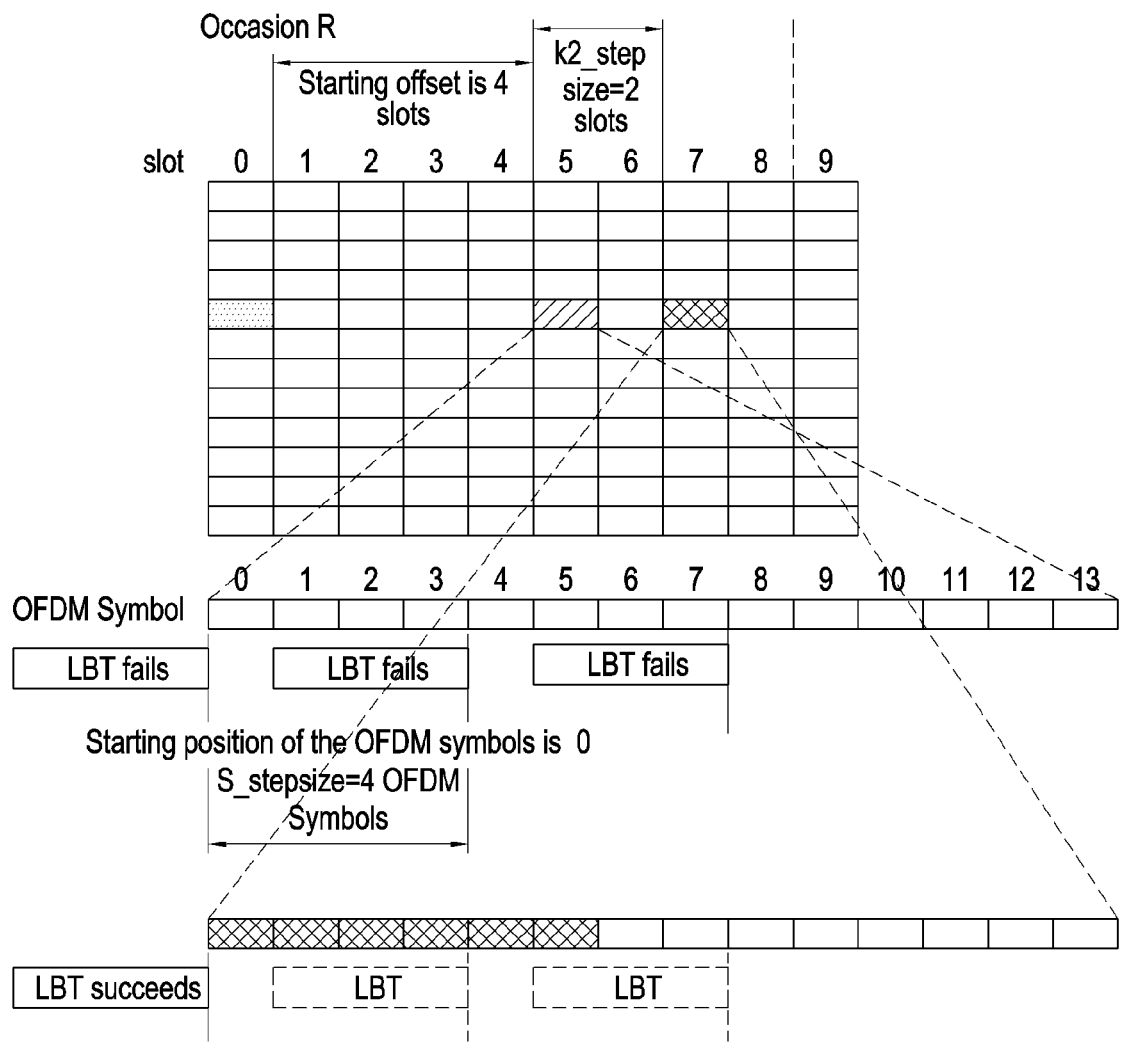
FIG. 6 illustrates a schematic diagram of a method for determining a signal transmission occasion according to an embodiment of the present application.
Figure 7:
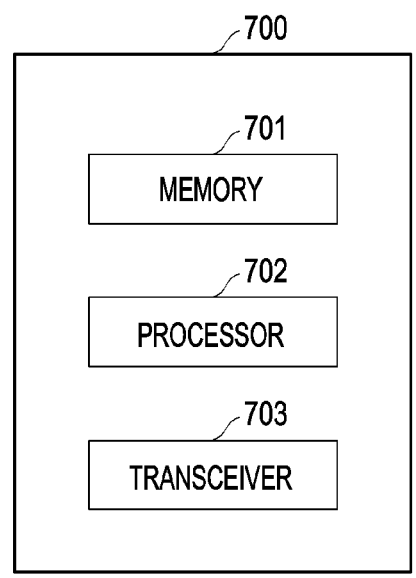
FIG. 7 illustrates another schematic block diagram of a User Equipment (UE) according to an embodiment of the present application.

When the UE receives the uplink grant information from the network at a time R, the time R may be an index of a slot in which the UE receives a PDCCH including an UL Grant, or an index of a slot in which the UE receives a PDSCH (for example, RAR) including the UL grant, or an index of a slot in which the UE receives a PDCCH indicating a PDSCH (for example, a PDCCH indicating a RAR) including the UL grant. According to the present disclosure, the time R may be defining the reference point to apply the slot level offset and/or the starting symbol position. The UE may then determine a time-frequency resource which may be used to transmit uplink transmission by using the acquired time-frequency resource configuration information, wherein When the UE determines k2_initial=4, S_initial=0, S_stepsize=4, L=6, and N_Sstepmax=2 (or N_S=8), as shown in FIG. 3, N_Sstep is a starting value adjustment counter of the second time unit position of the UE, and N_Sstep is initially set to 0; and a first slot, i.e., slot 5, after R+k2_initial=R+4 slots from the time R (slot 0) is a slot in which the time-frequency resource for transmission of the uplink data by the UE is located. In fourteen OFDM symbols in the slot 5, the UE uses an OFDM symbol S_initial=0 as a first starting position where the uplink data may be transmitted, and the UE performs LBT before the OFDM symbol 0. If the LBT fails, the UE makes adjustment by one step size value according to the configured S_stepsize, that is, a second starting position where the uplink data may be transmitted is an OFDM symbol S_initial+S_stepsize*N_Sstep=0+4*1=4, that is, the UE performs LBT before the OFDM symbol 4. If the LBT succeeds, the UE transmits the uplink data on L=6 OFDM symbols (i.e., OFDM4 to OFDM9) starting from the OFDM symbol 4 as the starting position. if the LBT still fails, the UE continues to find a next starting position where the uplink data may be transmitted as an OFDM symbol S_initial+S_stepsize*N_Sstep. Each time the UE fails in performing LBT, the N_Sstep value is added with 1 until the LBT succeeds, and the uplink data is transmitted; or until the N_Sstep reaches (or exceeds) the configured N_Sstepmax=2, and the UE stops the LBT attempt and abandons the current transmission. Specifically, the N_Sstepmax may be calculated based on the configured N_S and S_stepsize, for example, N_S/S_stepsize=8/4=2; or when the UE is limited to complete possible uplink transmission within a time T, for example, T=one slot (i.e., 14 OFDM symbols), the UE may further calculate N_Sstepmax, for example, $\lceil (14-L-S_{initial})/S_{stepsize} \rceil = (14-6-0)/4=2$, where $\lceil x \rceil$ represents a maximum non-negative integer not greater than x, wherein multiple transmission opportunities are determined using a symbol level offset (i.e., using initial starting symbol position and additional symbol level step size) according to the above embodiment of the present disclosure;

When the UE determines k2_initial=4, _initial=0, k2_stepsize=2, L=10, and N_k2stepmax=2 (or N_k2=4), as shown in FIG. 5, N_k2step is a starting offset adjustment counter of the first time unit position of the UE, and N_k2step is initially set to 0; and a first slot, i.e., slot 5 (for example, R+k2_initial+1=5), after R+k2 initial=R+4 slots from the time R (slot 0) is a slot in which the time-frequency resource for transmission of the uplink data by the UE is located. In fourteen OFDM symbols in the slot 5, the UE uses an OFDM symbol S_initial=0 as a first starting position where the uplink data may be transmitted, and the UE performs LBT before the OFDM symbol 0. If the LBT fails, the UE makes adjustment by one step size value according to the configured k2_stepsize, that is, a second starting position where the uplink data may be transmitted is an OFDM symbol 0 in a slot (R+k2_initial+k2_stepsize*N_k2step+1=0+4+2*1+1=7), that is, the UE performs LBT before the OFDM symbol 0 in the slot 7. If the LBT succeeds, the UE transmits the uplink data on L=10 OFDM symbols (i.e., OFDM0 to OFDM9) starting from the OFDM symbol 0 in the slot 7 as the starting position. if the LBT still fails, the UE continues to find a next starting position where the uplink data may be transmitted as an OFDM symbol 0 in a slot (R+k2_initial+k2_stepsize*N_k2step+1). Each time the UE fails in performing LBT, the N_k2step value is added with 1 until the LBT succeeds, and the uplink data is transmitted; or until the N_k2step reaches (or exceeds) the configured N_k2stepmax=2, and the UE stops the LBT attempt and abandons the current transmission. Specifically, the N_k2stepmax may be calculated based on the configured N_k2 and k2_stepsize, for example, N_k2/k2_stepsize=4/2=2; or when the UE is limited to complete possible uplink transmission within a time T, for example, T=one system frame (i.e., 10 slots under 15 khz), the UE may further calculate N_k2stepmax, wherein L=10<14, and therefore a slot in which transmission of the uplink data by the UE occupies is no more than one slot, which is represented as L_slot=1. For example, ⌊(10−R−k2$_{initial}$−L$_{slot}$)/k2$_{stepsize}$⌋=⌊(10−0−4−1)/2⌋=3, where ⌊x⌋ represents a minimum non-negative integer greater than x, wherein the multiple transmission opportunities are determined using a slot level offset (i.e., using initial slot level offset and additional slot level step size) according to the above embodiment of the present disclosure; and When the UE determines k2_initial=4, S_initial=0, k2_stepsize=2, S_stepsize=4, L=6, N_Sstepmax=2 (or N_S=8) and N_k2stepmax=2 (or N_k2=4), specifically, at this time, N_Sstepmax represents a maximum adjustment step of a starting value of a second time unit position which may be performed in one first time unit (or N_S represents a maximum adjustment amount of the starting value of the second time unit position which may be performed in one first time unit). As shown in FIG. 6, N_k2step is a starting offset adjustment counter of the first time unit position of the UE, and N_k2step is initially set to 0; N_Sstep is a starting value adjustment counter of the second time unit position of the UE, and N_Sstep is initially set to 0; and a first slot, i.e., slot 5 (for example, R+k2_initial+1=5), after R+k2_initial=R+4 slots from the time R (slot 0) is a slot in which the time-frequency resource for transmission of the uplink data by the UE is located. Firstly, the UE performs multiple LBT attempts in the first slot, i.e., in fourteen OFDM symbols in the slot 5, the UE uses an OFDM symbol S_initial=0 as a first starting position where the uplink data may be transmitted, and the UE performs LBT before the OFDM symbol 0. If the LBT fails, the UE makes adjustment by one step size value according to the configured S_stepsize, that is, a second starting position where the uplink data may be transmitted is an OFDM symbol S_initial+S_stepsize*N_Sstep=0+4*1=4 in the slot 5, that is, the UE performs LBT before the OFDM symbol 4. If the LBT succeeds, the UE transmits the uplink data on L=6 OFDM symbols (i.e., OFDM4 to OFDM9) starting from the OFDM symbol 4 as the starting position. if the LBT still fails, the UE continues to find a next starting position where the uplink data may be transmitted as an OFDM symbol S_initial+S_stepsize*N_Sstep in the slot 5. Each time the UE fails in performing LBT, the N_Sstep value is added with 1 until the LBT succeeds, and the uplink data is transmitted; or until the N_Sstep reaches (or exceeds) the configured N_Sstepmax=2, and the UE stops the LBT attempt in the current slot, and performs LBT attempt in a next possible slot, and then the UE resets N_Sstep to 0, adds N_k2step with 1, and makes adjustment by one step size value according to the configured k2_stepsize, that is, a next starting position where the uplink data may be transmitted is an OFDM symbol S_initial in a slot (R+k2_initial+k2_stepsize*N_k2step+1=0+4+2*1+1=7), that is, the UE performs LBT before the OFDM symbol 0 in the slot 7. Then, the UE performs LBT at multiple possible positions in the current slot using the above method, until the LBT succeeds, and the UE performs transmission of uplink data; or until the N_k2step reaches (or exceeds) the configured N_k2stepmax=2, and the UE stops the LBT attempt and abandons the current transmission. The above method of obtaining N_k2stepmax and/or N_Sstepmax by the calculation method is also applicable, and will not be described again, wherein multiple starting positions of msg.3 transmission are determined using both symbol level offset and slot level offset according to the above embodiment of the present disclosure.

With the above method, the UE may perform LBT attempt at multiple possible positions, which improves the possibility that the UE transmits the uplink data, and ensures the timeliness of the data communication, for example, ensures the success rate of the uplink transmission of the random access message 3, thereby facilitating avoiding a very high access delay.

In addition, in the NRU system, if for multiple UEs which read the same RAR, UE1 successfully performs LBT and transmits the message 3 at one time, other UEs, such as UE2, may successfully transmit the message 3 at another time, which facilitates the multiple UEs which are in a contention (select the same RO and/or preamble) accessing the network together, thereby improving the random access efficiency of the network.

Specifically, in the above method, after the UE successfully performs LBT at one position, the UE does not stop determination of a subsequent transmission resource occasion, may continue to determine a position where uplink data may be transmitted subsequently as the resource occasion, and performs LBT before the determined resource occasion. Once the LBT is successful again, the UE may transmit the uplink data again, that is, the UE may transmit multiple uplink data by using the UL grant, wherein the multiple uplink data may be the same (that is, the data is repeatedly transmitted) or different (that is, the data is different data), which is advantageous to increase the possibility of random access and/or increase an amount of data which may be transmitted by the UE.

It is to be illustrated that the above embodiments are only examples provided to illustrate the technical solutions according to the present application, and should not be construed as limiting the technical solutions according to the present application. For example, instead of the examples provided in the above embodiments, the above mentioned message/information name and parameter value name/value may also be set differently.

The present embodiment further provides a user equipment 700. The user equipment comprises a memory 701, a processor 702 and a transceiver having stored thereon computer executable instructions which, when executed by the processor, perform at least one of the methods corresponding to the various embodiments of the present disclosure.

Specifically, for example, the processor may be configured to acquire configuration information of a transmission resource of an uplink signal; determine, based on the configuration information, a resource occasion where the uplink signal is transmitted; initiate a Listen Before Talk (LBT) operation before the resource occasion; determine whether the LBT operation is successful; transmit the uplink signal at the resource occasion if the LBT operation is successful; and determine a next resource occasion where the uplink signal can be transmitted based on the configuration information if the LBT operation fails.

The present disclosure further provides a computer readable medium having stored thereon computer executable instructions which, when executed, perform any of the methods described in the embodiments of the present disclosure.

In another embodiment of the present application, a method for user equipment to determine downlink beam information used by a downlink signal to be received will be described. In a communication system, when a UE is triggered by a received PDCCH order to perform a random access process, the user needs to determine downlink beam information used by a message 2 in the random access process, to facilitate the user equipment determining the received beam to be used, so that the received signal has large enough power to facilitate correct demodulation of the data. In some cases, the downlink beam which is used by the PDCCH order received by the UE and the downlink beam used by the received random access message 2 do not have a Quasi Co-Located (QCL) relationship, for example, the UE receives the PDCCH order in CELL 1 (for example, Secondary Cell (SCell)), and transmits a message 1 in the random access process in the CELL 1, and the UE needs to try to receive the message 2 in the random access process in CELL2 (for example, SpCell). At this time, it is difficult to ensure that the downlink beam used by the received PDCCH order and the downlink beam used by the received random access message 2 have a QCL relationship.

In the present embodiment of the present application, there is proposed a method for a user equipment to determine downlink beam information used by a message 2 in a random access process to be received.

When at least one of the following conditions is satisfied:

1. the UE receives the PDCCH order in the SCell, which triggers the UE to transmit a random access process (which may be contention based random access or contention-free random access);

2. the UE receives the PDCCH order, which triggers the UE to transmit a random access process, and the UE discovers that configured QCL information in a control resource set (CORESET) associated with a search space where the received PDCCH order is located is not a type D of information; and 3. the UE receives the PDCCH order, which triggers the UE to transmit a random access process, and the UE discovers that a quasi-co-located characteristics in a control resource set (CORESET) associated with a search space where the received PDCCH order is located is not the same as or does not match a quasi-co-located characteristics in a CORESET associated with a search space where a PDCCH for detecting a DCI format 1_0 comprising a Cyclic Redundancy Check (CRC) which is scrambled with a corresponding RA-RNTI, or both of the CORESETs do not have quasi-co-located characteristics;

when the UE attempts to receive a DCI format 1_0 comprising a CRC which is scrambled with a corresponding RA-RNTI, the UE may receive the PDCCH comprising the DCI format 1_0 assuming that a DM-RS antenna port of a CORESET associated with a type-1 PDCCH Common Search space Set (CSS) has a quasi-co-located characteristics.

Figure 8:
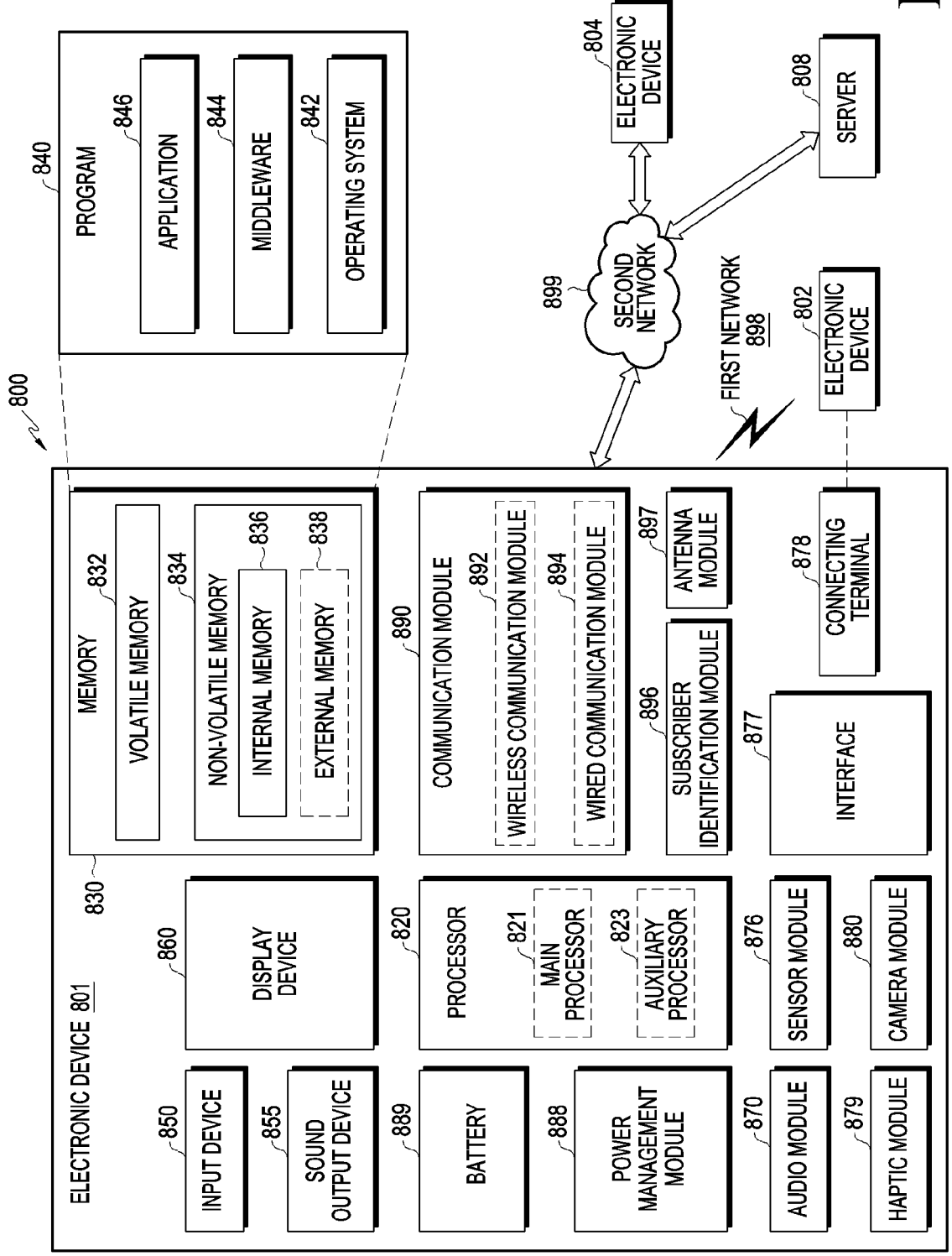
FIG. 8 is a block diagram illustrating an electronic device in a network environment according to various embodiments.

FIG. 8 is a block diagram illustrating an electronic device 801 in a network environment 800 according to various embodiments. The electronic device 801 may be the UE shown in FIG. 3. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thererto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The above description is merely a part of embodiments of the present application. It should be illustrated that those skilled in the art can also make several improvements and retouches without departing from the principle of the present application, and these improvements and retouches should be considered as falling within the protection scope of the present application.

The invention claimed is:

1. A method performed by a user equipment (UE) in a communication system, the method comprising:
   acquiring configuration information of a transmission resource of an uplink signal, wherein the configuration information comprises a starting offset of a first time unit and a starting value of a second time unit;
   determining, based on the configuration information, a resource occasion where the uplink signal is transmitted;
   initiating a listen before talk (LBT) operation before the resource occasion;
   determining whether the LBT operation is successful;
   transmitting the uplink signal at the resource occasion in case that the LBT operation is successful; and
   determining a next resource occasion where the uplink signal is to be transmitted based on the configuration information in case that the LBT operation fails.

2. The method of claim 1, wherein the configuration information of the transmission resource of the uplink signal is acquired based on at least one of:
   uplink grant information,
   separate dedicated channel indicator configuration,
   upper layer control signaling, or
   pre-configured parameter information.

3. The method of claim 2,
   wherein determining, based on the configuration information, the resource occasion where the uplink signal is transmitted comprises:
   determining, using time at which latest configuration information of the transmission resource of the uplink signal is acquired as a starting point, the resource occasion where the uplink signal is transmitted based on the starting offset of the first time unit and the starting value of the second time unit.

4. The method of claim 2, wherein determining the next resource occasion where the uplink signal is transmitted based on the configuration information comprises:
   determining, based on the configuration information, the next resource occasion where the uplink signal is transmitted, until the LBT operation is successful or a predetermined condition for abandoning transmission of the uplink signal is satisfied.

5. The method of claim 2, wherein determining the next resource occasion where the uplink signal is transmitted based on the configuration information comprises:
   determining, based on the configuration information, the next resource occasion where the uplink signal is transmitted, until the LBT operation is successful or a predetermined condition for abandoning transmission of the uplink signal is satisfied.

6. The method of claim 1, wherein determining the next resource occasion where the uplink signal is transmitted based on the configuration information comprises:
   determining, based on the configuration information, the next resource occasion where the uplink signal is transmitted, until the LBT operation is successful or a predetermined condition for abandoning transmission of the uplink signal is satisfied.

7. The method of claim 6, wherein the configuration information further comprises a starting offset adjustment step size of the first time unit and a starting value adjustment step size of the second time unit, and
   wherein determining, based on the configuration information, the next resource occasion where the uplink signal is transmitted, until the LBT operation is successful or the predetermined condition for abandoning transmission of the uplink signal is satisfied comprises:
   a) shifting another resource occasion by the starting value adjustment step size of the second time unit, and determining the shifted resource occasion as the next resource occasion where the uplink signal is transmitted, or shifting the resource occasion, which is determined based on the starting offset of the first time unit and the starting value of the second time unit, by N_S step times of the starting value adjustment step size of the second time unit, and determining the shifted resource occasion as the next resource occasion where the uplink signal is transmitted, where N_Sstep is an integer, and increases with a number of failures of the LBT operation;
   b) initiating the LBT operation before the next resource occasion where the uplink signal is transmitted;
   c) repeating steps a) and b) in case that the LBT operation fails, until the LBT operation is successful or the predetermined condition for abandoning the transmission of the uplink signal is satisfied;
   d) in case that the predetermined condition for abandoning the transmission of the uplink signal is satisfied but the LBT operation is still unsuccessful,
   shifting the resource occasion, which is determined based on the starting offset of the first time unit and the starting value of the second time unit, by N_k2step times of the starting offset adjustment step size of the first time unit, and determining the shifted resource occasion as the next resource occasion where the uplink signal is transmitted, where N_k2step is an integer, and increases with an execution number of step d); and
   e) repeating steps a) to d), until the LBT operation is successful or another predetermined condition for abandoning the transmission of the uplink signal is satisfied.

8. The method of claim 6, wherein the configuration information further comprises a starting value adjustment step size of the second time unit, and
   wherein determining, based on the configuration information, the next resource occasion where the uplink signal is transmitted, until the LBT operation is successful or the predetermined condition for abandoning the transmission of the uplink signal is satisfied comprises:
   a) shifting another resource occasion by the starting value adjustment step size of the second time unit, and determining the shifted resource occasion as the next resource occasion where the uplink signal is transmitted, or shifting the resource occasion, which is determined based on the starting offset of the first time unit and the starting value of the second time unit, by N_S step times of the starting value adjustment step size of the second time unit, and determining the shifted resource occasion as the next resource occasion where the uplink signal is transmitted, where N_Sstep is an integer, and increases with a number of failures of the LBT operation;
   b) initiating the LBT operation before the next resource occasion where the uplink signal is transmitted; and
   c) repeating steps a) and b) in case that the LBT operation fails, until the LBT operation is successful or the predetermined condition for abandoning the transmission of the uplink signal is satisfied.

9. The method of claim 6, wherein the configuration information further comprises a starting offset adjustment step size of the first time unit, and
wherein determining, based on the configuration information, the next resource occasion where the uplink signal is transmitted, until the LBT operation is successful or the predetermined condition for abandoning the transmission of the uplink signal is satisfied comprises:
a) shifting another resource occasion by the starting offset adjustment step size of the first time unit, and determining the shifted resource occasion as the next resource occasion where the uplink signal is transmitted, or shifting the resource occasion, which is determined based on the starting offset of the first time unit and the starting value of the second time unit, by N_k2step times of the starting offset adjustment step size of the first time unit, and determining the shifted resource occasion as the next resource occasion where the uplink signal is transmitted, where N_k2step is an integer, and increases with a number of failures of the LBT operation;
b) initiating the LBT operation before the next resource occasion where the uplink signal is transmitted; and
c) repeating steps a) and b) in case that the LBT operation fails, until the LBT operation is successful or the predetermined condition for abandoning the transmission of the uplink signal is satisfied.

10. A user equipment (UE) in a communication system, the UE comprising:
a transceiver; and
a processor configured to:
acquire configuration information of a transmission resource of an uplink signal, wherein the configuration information comprises a starting offset of a first time unit and a starting value of a second time unit,
determine, based on the configuration information, a resource occasion where the uplink signal is transmitted,
initiate a listen before talk (LBT) operation before the resource occasion and determine whether the LBT operation is successful,
transmit, via the transceiver, the uplink signal at the resource occasion in case that the LBT operation is successful, and
determine a next resource occasion where the uplink signal is to be transmitted based on the configuration information in case that the LBT operation fails.

11. The UE of claim 10, wherein the configuration information of the transmission resource of the uplink signal is acquired based on at least one of:
uplink grant information,
separate dedicated channel indicator configuration,
upper layer control signaling, or
pre-configured parameter information.

12. The UE of claim 11, wherein the processor is configured to determine, based on the configuration information, the next resource occasion where the uplink signal is transmitted, until the LBT operation is successful or a predetermined condition for abandoning transmission of the uplink signal is satisfied.

13. The UE of claim 11,
wherein the processor is configured to determine, using time at which latest configuration information of the transmission resource of the uplink signal is acquired as a starting point, the resource occasion where the uplink signal is transmitted based on the starting offset of the first time unit and the starting value of the second time unit.

14. The UE of claim 13, wherein the processor is configured to determine, based on the configuration information, the next resource occasion where the uplink signal is transmitted, until the LBT operation is successful or a predetermined condition for abandoning transmission of the uplink signal is satisfied.

15. The UE of claim 10, wherein the processor is configured to determine, based on the configuration information, the next resource occasion where the uplink signal is transmitted, until the LBT operation is successful or a predetermined condition for abandoning transmission of the uplink signal is satisfied.

16. The UE of claim 15, wherein the configuration information further comprises a starting offset adjustment step size of the first time unit, and
wherein the processor is configured to:
a) shift another resource occasion by the starting offset adjustment step size of the first time unit, and determine the shifted resource occasion as the next resource occasion where the uplink signal is transmitted, or shift the resource occasion, which is determined based on the starting offset of the first time unit and the starting value of the second time unit, by N_k2step times of the starting offset adjustment step size of the first time unit, and determine the shifted resource occasion as the next resource occasion where the uplink signal is transmitted, where N_k2step is an integer, and increases with a number of failures of the LBT operation,
b) initiate the LBT operation before the next resource occasion where the uplink signal is transmitted, and
c) repeat operations a) and b) in case that the LBT operation fails, until the LBT operation is successful or the predetermined condition for abandoning the transmission of the uplink signal is satisfied.

17. The UE of claim 15, wherein the configuration information further comprises a starting offset adjustment step size of the first time unit and a starting value adjustment step size of the second time unit, and
wherein the processor is configured to:
a) shift another resource occasion by the starting value adjustment step size of the second time unit, and determine the shifted resource occasion as the next resource occasion where the uplink signal is transmitted, or shift the resource occasion, which is determined based on the starting offset of the first time unit and the starting value of the second time unit, by N_Sstep times of the starting value adjustment step size of the second time unit, and determine the shifted resource occasion as the next resource occasion where the uplink signal is transmitted, where N_Sstep is an integer, and increases with a number of failures of the LBT operation;
b) initiate the LBT operation before the next resource occasion where the uplink signal is transmitted;
c) repeat operations a) and b) in case that the LBT operation fails, until the LBT operation is successful or the predetermined condition for abandoning the transmission of the uplink signal is satisfied;
d) in case that the predetermined condition for abandoning the transmission of the uplink signal is satisfied but the LBT operation is still unsuccessful, shift the resource occasion, which is determined based on the starting offset of the first time unit and the starting value of the second time unit, by N_k2step times of the starting offset adjustment step size of the first time unit, and determine the shifted resource occasion as the next resource occasion where the uplink signal is transmitted, where N_k2step is an integer, and increases with an execution number of operation d), and
e) repeat operations a) to d), until the LBT operation is successful or another predetermined condition for abandoning the transmission of the uplink signal is satisfied.

18. The UE of claim 15, wherein the configuration information further comprises a starting value adjustment step size of the second time unit, and wherein the processor is configured to:
a) shift another resource occasion by the starting value adjustment step size of the second time unit, and determine the shifted resource occasion as the next resource occasion where the uplink signal is transmitted, or shift the resource occasion, which is determined based on the starting offset of the first time unit and the starting value of the second time unit, by N_Sstep times of the starting value adjustment step size of the second time unit, and determine the shifted resource occasion as the next resource occasion where the uplink signal is transmitted, where N_Sstep is an integer, and increases with a number of failures of the LBT operation,
b) initiate the LBT operation before the next resource occasion where the uplink signal is transmitted, and
c) repeat operations a) and b) in case that the LBT operation fails, until the LBT operation is successful or the predetermined condition for abandoning the transmission of the uplink signal is satisfied.

19. A non-transitory computer readable storage medium having stored thereon executable instructions which, when executed by a processor, cause the processor to:

acquire configuration information of a transmission resource of an uplink signal, wherein the configuration information comprises a starting offset of a first time unit and a starting value of a second time unit;
determine, based on the configuration information, a resource occasion where the uplink signal is transmitted;
initiate a listen before talk (LBT) operation before the resource occasion;
determine whether the LBT operation is successful;
transmit the uplink signal at the resource occasion in case that the LBT operation is successful; and
determine a next resource occasion where the uplink signal is possible to be transmitted based on the configuration information in case that the LBT operation fails.

* * * * *